United States Patent
Philippin et al.

(10) Patent No.: US 10,239,139 B2
(45) Date of Patent: Mar. 26, 2019

(54) METHOD FOR MACHINING A SET OF TEETH, TOOL ARRANGEMENT, AND TOOTH-CUTTING MACHINE

(71) Applicant: GLEASON-PFAUTER MASCHINENFABRIK GMBH, Ludwigsburg (DE)

(72) Inventors: Matthias Philippin, Rutesheim (DE); Ralf Schmezer, Ludwigsburg (DE); Joachim Grill, Bondorf (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 45 days.

(21) Appl. No.: 15/526,766

(22) PCT Filed: Nov. 23, 2015

(86) PCT No.: PCT/EP2015/002357
§ 371 (c)(1),
(2) Date: May 15, 2017

(87) PCT Pub. No.: WO2016/091356
PCT Pub. Date: Jun. 16, 2016

(65) Prior Publication Data
US 2017/0326662 A1  Nov. 16, 2017

(30) Foreign Application Priority Data
Dec. 10, 2014  (DE) .......................... 10 2014 018 328

(51) Int. Cl.
*B23F 19/10*  (2006.01)
*B23F 5/16*  (2006.01)
*B23F 21/10*  (2006.01)

(52) U.S. Cl.
CPC .............. *B23F 19/10* (2013.01); *B23F 5/163* (2013.01); *B23F 19/101* (2013.01); *B23F 21/10* (2013.01); *Y10T 409/101113* (2015.01)

(58) Field of Classification Search
CPC ........ B23F 19/10; B23F 19/101; B23F 5/163; Y10T 409/101113
See application file for complete search history.

(56) References Cited

U.S. PATENT DOCUMENTS

| 2,278,300 A | * | 3/1942 | Barter | ..................... B23F 19/10 |
| | | | | 29/76.1 |
| 2,683,399 A | | 7/1954 | Dodge | |

(Continued)

FOREIGN PATENT DOCUMENTS

| DE | 2157619 B1 | 10/1972 |
| DE | 2157619 C | 5/1973 |

(Continued)

OTHER PUBLICATIONS

International Search Report and Written Opinion for PCT/EP2015/002357, ISA/EPO, dated Mar. 14, 2016, 13 pgs.

(Continued)

*Primary Examiner* — Daniel W Howell
(74) *Attorney, Agent, or Firm* — Robert L. McDowell

(57) ABSTRACT

The invention relates to a method for machining a toothing, wherein to form a chamfer on a tooth edge formed between an end face of the toothing and a tooth flank belonging to a tooth space of the toothing, material is removed from the tooth edge by cutting, by means of a machining tool equipped with a cutting edge, in a machining operation, wherein the machining tool is toothed and the machining operation is a skiving machining operation at an axis intersection angle between the rotational axes of the machining (Continued)

Figure 1:
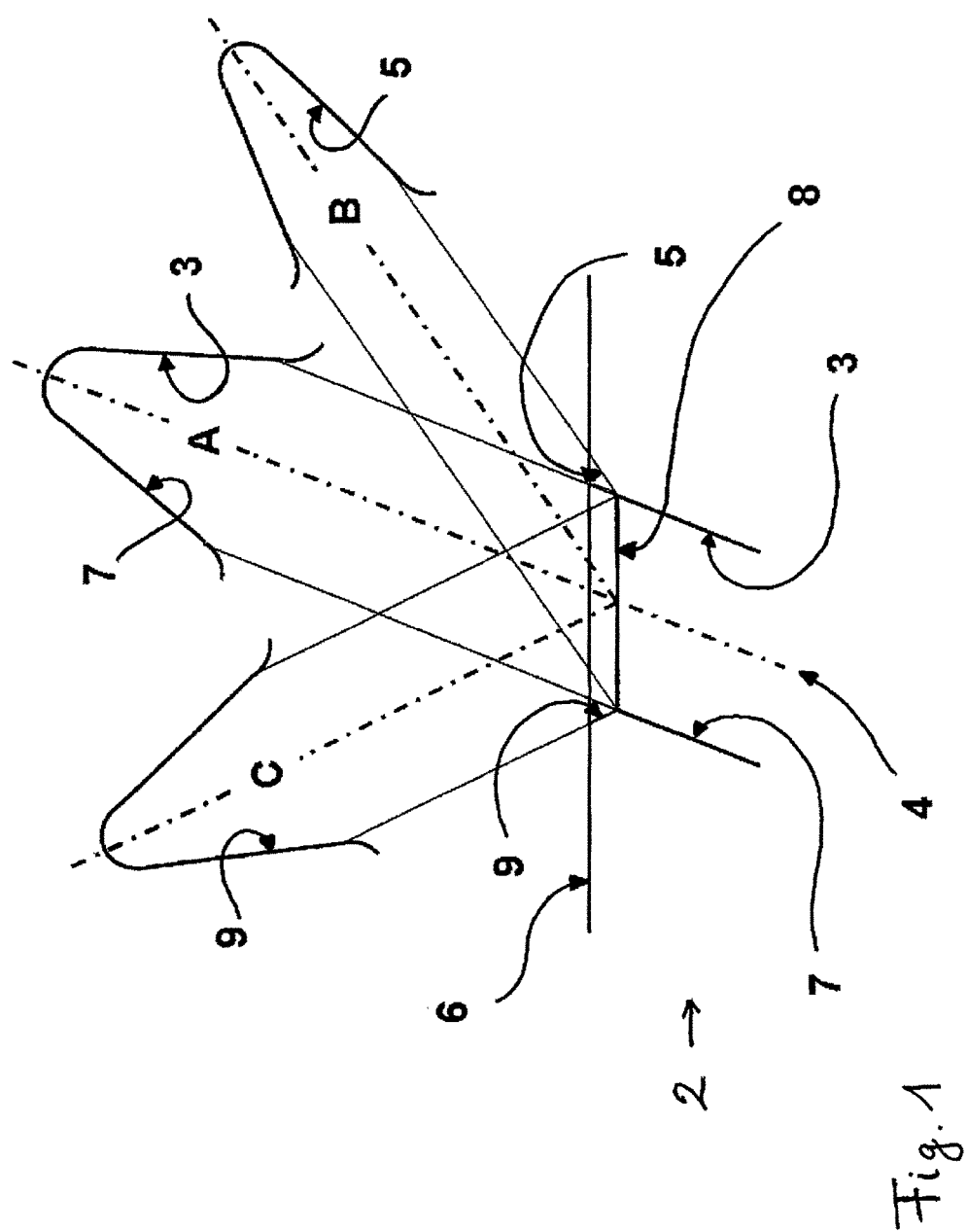

tool and the toothing, which does not extend beyond the tooth root section of the tooth space.

19 Claims, 4 Drawing Sheets

(56) References Cited

U.S. PATENT DOCUMENTS

| | | | |
|---|---|---|---|
| 3,399,599 A * | 9/1968 | Looman | B23F 5/163 |
| | | | 409/34 |
| 4,068,558 A * | 1/1978 | Loos | B23F 19/10 |
| | | | 407/27 |
| 6,676,337 B2 | 1/2004 | Daniek | |
| 7,377,731 B1 | 5/2008 | Arvin | |
| 2010/0278605 A1 | 11/2010 | Gleason-Pfauter | |
| 2012/0328384 A1 | 12/2012 | Klingelnberg | |
| 2013/0121779 A1 | 5/2013 | Geiser | |
| 2016/0158861 A1 | 6/2016 | Gleason-Pfauter | |

FOREIGN PATENT DOCUMENTS

| | | | |
|---|---|---|---|
| DE | 2817889 A1 * | 11/1978 | ............. B23F 19/10 |
| DE | 10230148 A1 | 1/2004 | |
| DE | 102009019433 A1 | 11/2010 | |
| DE | 102013012797 A1 | 2/2015 | |
| EP | 1270127 A1 | 1/2003 | |
| EP | 2537615 A1 | 12/2012 | |
| JP | 10-337614 A | 12/1998 | |
| WO | 2009/017248 A2 | 2/2009 | |
| WO | WO 2011114558 A1 * | 9/2011 | ............. B23F 19/10 |

OTHER PUBLICATIONS

German Search Report for DE Appln. No. 102014018328.9, dated Oct. 21, 2015, 7 pgs.

Espacenet, EPO, Bibliographic data for JP-H-10-337614, English Abstract, 1pg.

* cited by examiner

METHOD FOR MACHINING A SET OF TEETH, TOOL ARRANGEMENT, AND TOOTH-CUTTING MACHINE

The invention relates to the field of finishing gear teeth, and specifically to a method for machining a toothing, wherein, in order to form a chamfer on a tooth edge formed between an end face of the toothing and a tooth flank belonging to a tooth space of the toothing, material is removed from the tooth edge by cutting during a machining operation by means of a machining tool which is configured with a cutting edge, and to a tool arrangement suitable for the same, and to a toothing machine.

Methods are known for finishing gear teeth. An overview is found in Thomas Bausch, "*Innovative Zahnradfertigung*," third edition, on page 304. The gear teeth finishing proceeds from the toothing after its creation, for example by hobbing or generating shaping. In hobbing processes, so-called primary burrs are created along the front tooth edges where the cutting edges of the hob emerge—as shown in the Bausch publication on page 304, top center, in FIG. 8.1-1. These burrs have sharp edges and are solid. They must be removed to prevent injuries and to improve the tooth geometry for the remainder of the process. This is usually done by fixed deburring irons, via deburring disks or filing disks which travel with the tool, usually directly involved in the process of creating the gears.

Simply removing the primary burr, for example by twisting it off, is often not sufficient to meet quality requirements for the tooth edges. For this reason a chamfer is typically formed on the tooth edges (front edges). In the Bausch document, the front edge is labeled with B in FIG. 8.1-1, top left. At top right, it is shown with the chamfer added to make a spur gear. In the case of helical gearing, with chamfers between the flank lines and the front transverse plane, there is an obtuse angle on the one side, and an acute angle on the other side. The geometries of the chamfers (chamfer parameters) can be specified by the chamfer angle, for example—that is, the angle between the orientation of the chamfer with respect to the transverse plane—and the size of the chamfer, which can be specified by, for example, how far the chamfer protrudes into the tooth flanks from the end face, normal to the end face, and/or via the chamfer width. This is usually done using appropriate tolerances for the chamfer which contain this information.

Methods exist in which the chamfer is produced by cutting. As such, DE 10 2009 019 433 shows a chamfering device having a cutting wheel. The cutting wheel axis can be rotated by 180°, such that the cut on the upper and lower front ends of the teeth can always be performed from the inside towards the outside, and with only one—preferably relatively small—tool.

However, methods in which a plastic deformation of the tooth edges occurs by means of pressing in rollers in a processing step, using toothed chamfering tools, are more common. The material of the tooth edges is plastically deformed, compressed, and displaced. This can lead to a flow of material in the direction of the tooth flanks, as well as to the end faces; the resulting material bulges are called secondary burrs. This technology is described in the Bausch article, on pages 308 and 309, and FIG. 8.2-5 depicts suitable tools for this. Also, such methods are described in EP 1 279 127. Methods are also known—such as described in WO 2009/017248—in which the material displacement is specifically directed more to the end face and less to the tooth flank.

Moreover, measures to remove the likewise undesired secondary burrs are also well-known. The material bulges on the tooth flanks can, for example, be smoothed or removed in a further milling cut, the front-end bulges can be twisted off or removed, for example, with a sander disk.

The problem addressed by the invention is that of providing a method for forming a chamfer on a front edge of a tooth, wherein it is possible to reliably produce chamfers of high quality and with small tolerances compared to desired chamfer shapes.

This problem is addressed, in terms of the method design, by the invention by an implementation of the method of the aforementioned type, which is substantially characterized in that the machining tool is toothed, and the machining operation is a generating machining operation, performed at an axis intersection angle between the rotational axes of the machining tool and the toothing, and does not extend beyond the tooth root section of the tooth space.

According to the invention, toothed machining tools are therefore used which, during a machining operation, effectively only machine one of the two front tooth edges of the same end face belonging to one tooth space. The phrase, "not beyond the tooth root section" should therefore be understood to mean that a chamfer can certainly be formed on the tooth root during the machining operation, and there can optionally also be a machining contact beyond the tooth space center in the root section; however, no chamfer is formed on the opposing front edge. Specifically, this can be done, according to a preferred embodiment of the invention, in a different, subsequent machining operation.

As a result of the generating machining operation, with a rotating machining tool and rotating teeth, all front edges of the teeth—for example, the left tooth flanks of the tooth spaces—can be machined in a single pass in the same machining operation. The kinematics of the machine axes and cutting is that of skiving (power skiving) due to the axis intersection angle between the respective axes of rotation, as generally known to a person skilled in the art of gearing technology from the fields of tooth generation and/or finishing (hard skiving). A good introduction and overview of the kinematics, and the resulting cutting processes, is found in EP 2 537 615. The as yet unpublished DE 2013 012 797 describes how a circular skiving tool, which is designed for skiving toothings, achieves a cutting direction component orthogonal to the tooth flanks with a tilt angle introduced in addition to the axis intersecting angle, such that when this circular skiving tool is used, a chamfer is generated near the end face simultaneously on both opposing tooth flanks of a tooth space.

Especially for gearing helical workpieces with the above-mentioned acute and obtuse chamfer angles, it is preferred that the other machining operation is carried out with another machining tool. In this context, the other machining operation is preferably carried out at a different axis intersection angle.

In a particularly preferred embodiment, first toothing data of a first tooth, whose helix angle is determined by the orientation of the chamfer, wherein the transverse section profile thereof matches that of the toothing being machined in the transition from the tooth flank into the tooth edge chamfer being formed, is determined before the machining of the chamfer from predetermined chamfer parameters for the chamfer (obtainable, for example, from the above-mentioned tolerance ranges) which relate to its size and its orientation to the end face, as well as from toothing parameters of the toothing being machined, relating to its profile, and optionally helix angle. The same process can be repeated on the other tooth edge, and second data of a second equivalent toothing can be determined in this way for the other front edge with chamfer.

With this perspective, the chamfer of the front edge is therefore regarded with a completely different meaning—specifically as a tooth flank of a virtual equivalent toothing of a very narrow tooth width. The respective profile of this equivalent (helical) toothing can be easily modelled by the conventional means used for determining tooth shape. In a shared front transverse plane at the transition of the tooth flanks of the toothing which will actually be produced to the chamfer of the tooth being generated (the shared front transverse plane), there are agreements on both flanks with the associated equivalent toothing. The chamfer orientation of the toothing being machined in this case provides the information about the helix angle for the respective equivalent toothing on both sides.

It is also advantageous that the machining tool is configured according to the first toothing data, and the machining tool is particularly a circular skiving tool configured to generate the first equivalent toothing by skiving, wherein the other machining tool can be configured analogously based on the second toothing data.

In this perspective, rather than material being somehow cut away from the tooth edges, a new helical toothing is generated in the region close to the end face, the tooth flanks of which appear as a chamfer for the already generated toothing. This makes it possible to produce very precise chamfers which are reproducibly within the tolerance range of tight tolerances. To the extent that the tolerance ranges for the chamfers are tighter than a tolerance in the width of the toothed workpieces, then the deviation of the toothing width from a desired value for each toothing being machined is preferably detected (for example, by means of sensors making distance measurements, or optical means), and the machine axes are controlled according to this deviation for the relative movement required for the machining operation.

This aspect of the invention is also disclosed independently and considered worthy of protection, regardless of the kinematics of the machining operations made to form the chamfer. As such, a method for forming a chamfer on a tooth edge formed between an end face of a toothing and a tooth flank belonging to a tooth space of the toothing, wherein toothing data of a first toothing, whose helix angle is determined by the orientation of the chamfer, wherein the transverse section profile thereof matches that of the toothing being machined in the transition from the tooth flank into the tooth edge chamfer being formed, is determined from predetermined chamfer parameters for the chamfer which relate to its size and its orientation to the end face, as well as from toothing parameters of the toothing being machined, relating to its profile and optionally helix angle, and wherein the machining tool is configured to form the chamfer according to the toothing data, is disclosed as independently worthy of protection.

In a preferred form of the method, the machining tool and the other machining tool have a shared axis of rotation which can particularly be pivoted by more than 180°. By pivoting the axis of rotation by 180°, with a corresponding linear positioning, the two machining tools can then also generate the chamfers on the other end face of the toothing in the same manner as on the first end face. As such, the tool moves into two positions per end face, corresponding to the respective machining operations, such that there is a total of four positionings per toothing. These can be calculated in advance, just like the configuration of the machining tools.

The machining tool and/or the other machining tool can be designed as straight-toothed circular skiving tools, which simplifies their production. In this context, the axis intersection angle of the machining operation/other machining operation of the machining tool/other machining tool is set to the helix angle of the first/second equivalent toothing. The positionings required for this, as well as the approach paths, setting and overrun distances, rotary speeds and advances can likewise be simulated by software prior to the machining.

As is common for obtaining the correct skiving positions required for the synchronous coupling of the tools with the toothing, the positions of the tool cutting edges, as well as the positions of the toothing of the workpiece, can be measured exactly and fed to the control software. Centering operations—so-called centering-in—known from the prior art can be performed for this purpose. The position of the workpiece toothing, particularly the height of the two end faces, can also be detected outside of the site of the actual machining, for example by the workpiece being positioned prior on a defined workpiece carrier and loaded into the machining station along with the same. The same applies to the above-mentioned determination of the heights of the end faces of the toothing of the workpiece, which can also be determined within or outside of the site of the actual machining position.

In a further method aspect, it can also be contemplated that a non-zero tilt angle is set between the axis of rotation of the machining tool and a plane which is orthogonal to the connecting direction between the centers of the toothing and machining tool. No additional rotary axis on the machine is required for this. Rather, such a relative position between the workpiece toothing and the machining tool can be achieved by linear axis positionings—wherein an offset is undertaken in the plane which is orthogonal to the toothing axis. In this way, an additional possibility is obtained to influence the shape of the generated chamfers, which to a certain extent enables the configuration of machining tools for a prespecified equivalent toothing, and to generate, using the same, chamfers by corresponding corrective movements of the machine axes which lead to toothings which differ from the equivalent toothing in the perspective explained above.

In terms of device design, the problem is addressed by a tool arrangement for forming a chamfer on the tooth edges between an end face of a toothing and the tooth flanks thereof, having a first wheel-like machining tool which is toothed on the front, the axis of rotation of which can be pivoted by particularly more than 180° to form the chamfer on one side of the tooth space of the toothing, and having a second wheel-like, machining tool which is toothed on the front, particularly with the same axis of rotation to form the chamfer on the other side of the tooth space. The tool arrangement is therefore particularly a special arrangement of differently designed circular skiving tools.

The advantages of the tool arrangement according to the invention result from the advantages of the inventive method. As explained above, a simplification can be achieved by the first and/or second machining tool having straight teeth. Moreover, it can be advantageous for the first/second machining tool to be made in the form of a cylindrical circular skiving tool, for the crown circle diameter of the tools to differ by no more than 15%, preferably not more than 10%, particularly not more than 5%, for the machining tools to be formed without cutting face angle and/or the machining tools to be formed without relief grinding. The "and/or" combination here shows that every individual feature of this list may be in itself advantageous, yet can also be used in combination. This results in advantages in the regrinding of the circular skiving tools, which is now simpler; with a cylindrical shape, the radial position of the teeth relative to the tool spindle also does not change upon regrinding.

In particular, it is preferred that a cutting surface of the machining tools is particularly a direct contact surface on the tool spindle. Because the cutting surface consequently serves after each regrinding as a contact surface on the tool spindle, the axial position of the cutting edge relative to the tool spindle does not change. The setup of the chamfering device, and its operation, are greatly simplified in this way.

This aspect is also disclosed by the invention as independently worthy of protection. The invention therefore also relates to the use of a particularly cylindrical circular skiving tool for forming a chamfer on a tooth edge formed between an end face and a tooth flank of a toothing, in an arrangement in which a cutting surface of the circular skiving tool is a contact surface on the tool spindle, such that the axial position of the cutting edge relative to the tool spindle does not change even after regrinding.

Otherwise, of course relief-ground circular skiving tools can also be used, as can circular skiving tools with cutting face angle or helical circular skiving tools, as well as circular skiving tools with step cut, or combinations thereof.

In a further preferred embodiment, there is a shared drive for the two machining tools, wherein the drive force can particularly be applied between the machining tools. The drive can be a belt drive or direct drive, by way of example. In this way, a compact and energy-efficient form of the tool arrangement results.

In this context, the front sides with the cutting edges of the machining tools should face toward each other or away from each other - particularly toward each other. A distance between the machining tools is made sufficiently large in this case to reliably prevent a collision of the other machining tool with the toothing during the machining operation of a machining tool.

A chamfering station with such a tool arrangement can include one, preferably at least two, and particularly at least three linearly independent linear machine axes for positioning the machining arrangement with respect to a workpiece position.

Finally, the invention places under protection a toothing machine having a workpiece spindle to receive a workpiece in a manner allowing rotary drive, a primary tool for generating a toothing on the workpiece, and a machine axis for setting an axis intersection angle between a toothed machining tool for forming a chamfer on a tooth edge formed between an end face of the toothing and a tooth flank belong to a tooth space of the toothing, which is essentially characterized by a control device which is programmed to allow running a method on the toothing machine according to one of the method aspects described above, and/or a chamfering station having a tool arrangement according to one of the aspects described above.

Figure 2:
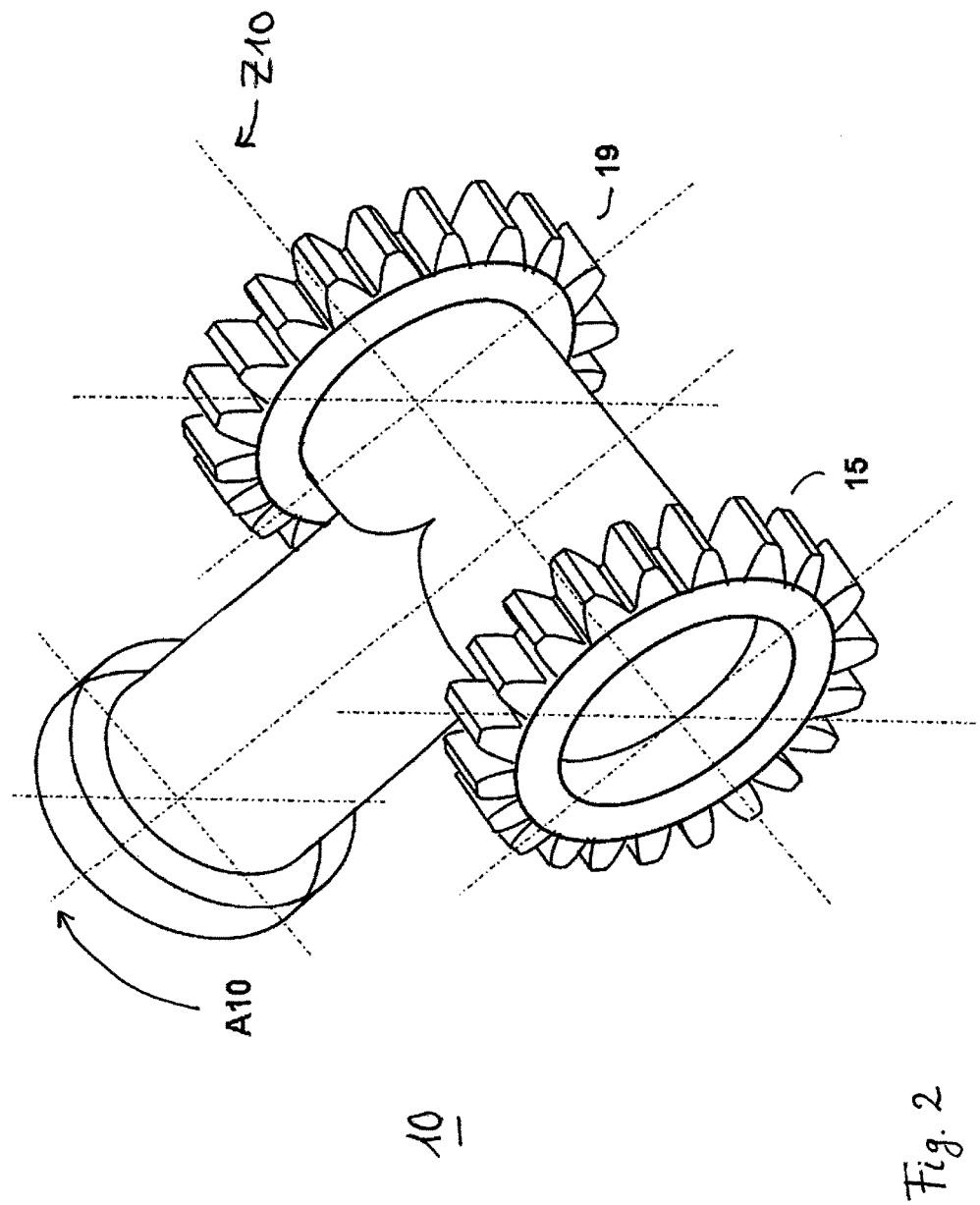
Figure 3:
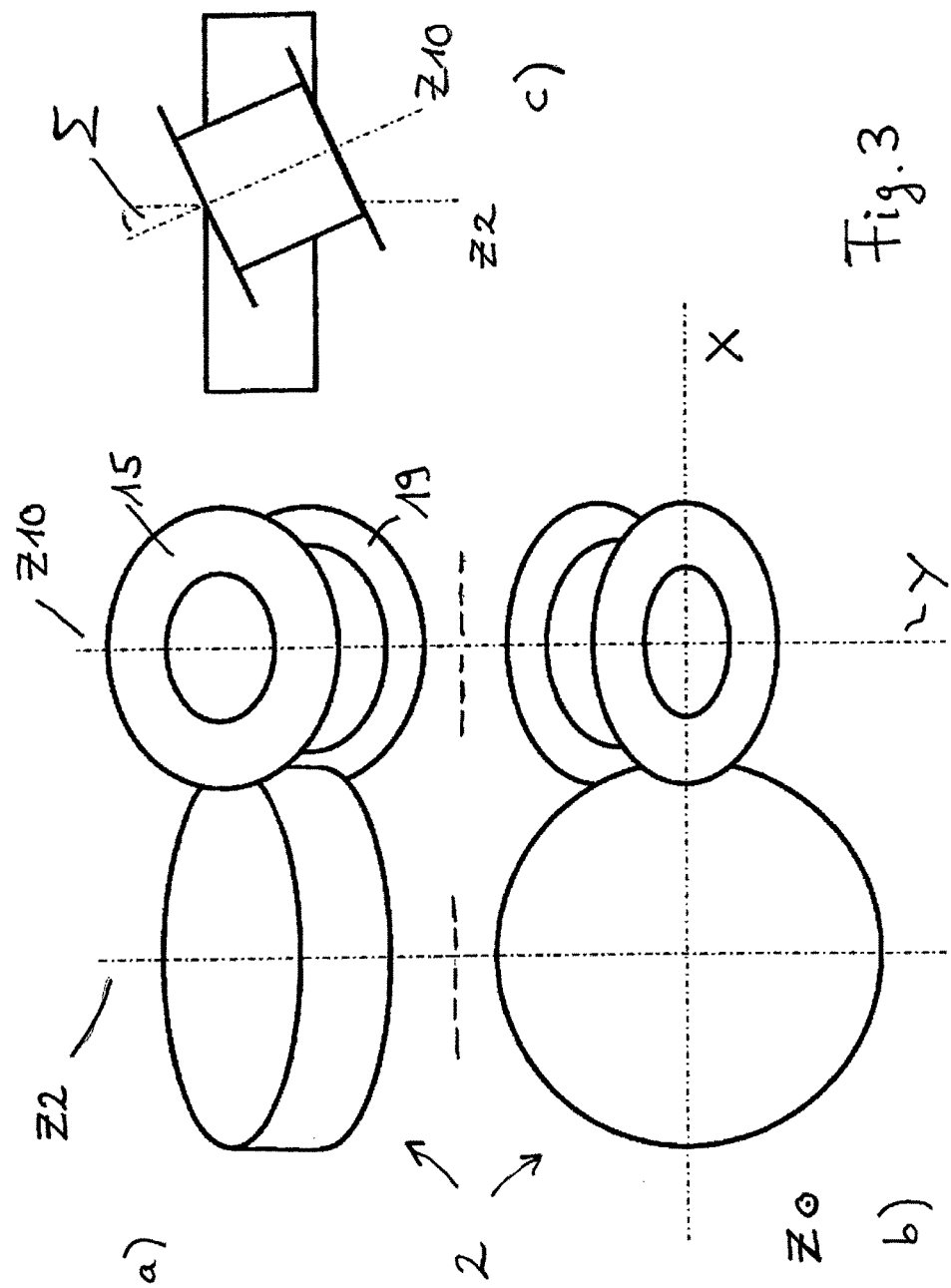
Figure 4:
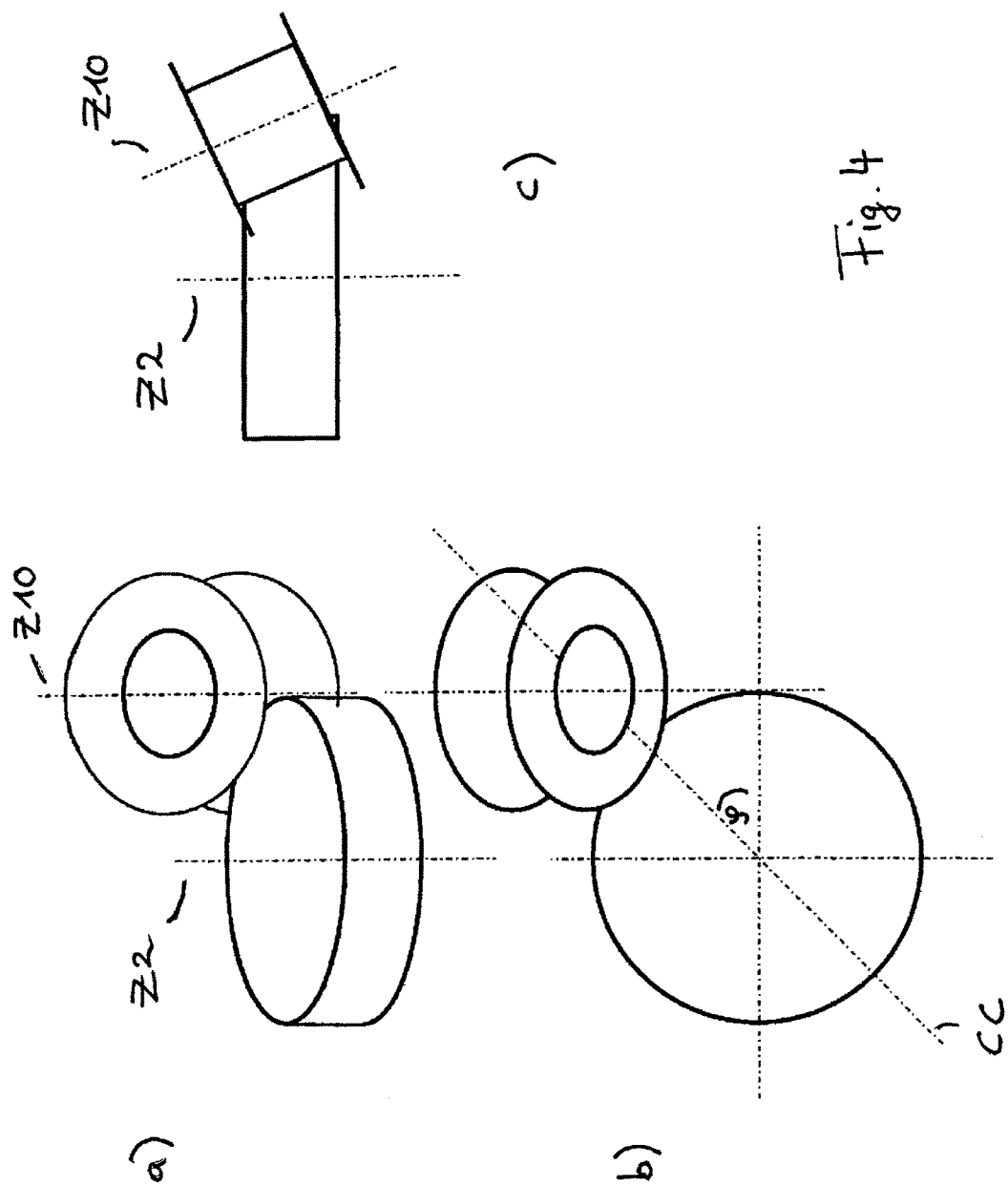

The invention is described with reference to the drawings; reference is expressly made to the drawings for all details which are essential to the invention and are not exhibited in greater detail in the description, wherein:

FIG. 1 shows a sectional view of a toothing and the normal section profile of the toothing, and two virtual equivalent toothings, FIG. 2 shows a tool arrangement with two chamfering circular skiving tools, FIG. 3 shows a positional relationship between the axes of rotation of the toothing and the circular skiving tool, and FIG. 4 shows another positional relationship of the axes of rotation of the toothing and the circular skiving tool.

The lower region of FIG. 1 shows an axial sectional view of a toothing 2, wherein the sectional plane passes through two teeth of the toothing 2, wherein the tooth space 4 lies between their mutually facing tooth flanks 3 and 7. The sectional plane is thus orthogonal to the end face 6 and is parallel to the toothing axis Z2 of the toothing 2.

In the upper portion of FIG. 1, the normal section profile of the toothing 2 is shown, and the toothing 2 is denoted by A.

Since the toothing 2 is a helical toothing, an obtuse angle is formed between the tooth flank 3 and the end face 6, while between the tooth flank 7 and the end face 6, an acute angle is formed. This leads to different orientations of the chamfer 5 to be formed on the front edge of the tooth flank 3 and of the chamfer 9 to be formed on the front edge of the tooth flank 7, which are also plotted in FIG. 1 below. These orientations, as well as the chamfer size—here measured as the distance of the end face 6 to a front transverse plane 8 where the tooth flanks 3, 7 transition into the chamfers 5, 9—are prespecified, for example as part of the above-mentioned tolerance ranges. The toothing 2 is with the chamfers 5, and 9 is thus defined by, on one hand, the toothing parameters for the generation of the toothing, which include the normal section profile of A, as well as the helix angle β of the toothing, and the chamfer parameters of the chamfers 5 and 9, which include the orientation relative to the transverse plane and the chamfer size thereof. The profile of the toothing A can be, for example, an involute profile; the toothing parameters of the toothing 2 could be, by way of example: module=5 mm, pressure angle=20°, helix angle β=25°, and profile shift coefficient of 0.17.

For now, the toothing 2 will be considered only in the region between the transverse plane 8 and the end face 6—that is, only a "thin" slice of the toothing 2, the width of which is determined by the chamfer size. In this thin slice, the normal section profile is determined for both sides of the space, representing the virtual equivalent toothings B, C in the wording of the claims. Because of the chamfers 5, 9 which will be formed, different toothing data results for these equivalent toothings B, C.

FIG. 1 illustrates the normal section profile of the particular equivalent toothing B determined on the side of the chamfer 5, and the equivalent toothing C belonging to the chamfer 9. Specifically, for the embodiment of the equivalent toothing B, a module of 3.472 mm, a helix angle of 55.09° right, and a profile shift coefficient of −2.915 result, while the toothing data for the equivalent toothing C is: module 5.162 mm, helix angle 19.91° left, profile shift coefficient 0.291. In the transverse plane 8, the transverse section profiles of A and B transition into one another on the side of the tooth flank 3; on the side of the tooth flank 7, the end section profiles of A and C transition into each other.

According to this perspective, the toothing 2 with the chamfers 5 and 9 is thus composed of the region between the end face 6 and the transverse plane 8 of the toothing B on the side of the chamfer 5, and the toothing C on the side of the chamfer 9 and the adjoining region up to the other end face (or the chamfers formed there) of the toothing A. The formation of the chamfers 5, 9 is then achieved by designing circular skiving tools, wherein the design in chosen such that using these circular skiving tools, the equivalent toothings B and/or C could be generated in the circular skiving tool kinematics. If at this point a previously-generated toothing 2 is assumed which corresponds to the toothing A, and no chamfers have been formed on the front edges, then the chamfer 5 and the chamfer 9 are formed one after the other with the circular skiving tool designed for the toothings B and/or C, under the kinematic conditions of the skiving.

FIG. 2 illustrates a tool arrangement 10 in a perspective view. A CNC-controlled drive, here a belt drive (not shown) of the tool arrangement 10, drives the single tool spindle thereof, whose spindle axis defines the tool rotational axis Z10 of the circular skiving tools 15 and 19, the same directly contacting the tool spindle with their mutually-facing cutting surfaces. In addition, the tool arrangement 10 must be housed in a chamfer station, able to pivot about a pivot axis A10, such that the circular skiving tools 15, 19 for chamfering are able to switch the positions shown in FIG. 2, and can be set for the machining to a desired axis intersection angle for the toothing axis Z2.

The tool spindle thus receives both circular skiving tools 15, 19 for the chamfering simultaneously, yet only one of the two circular skiving tools 15, 19 is in machining engagement with the toothing 2.

Both the circular skiving tool 15 for the chamfering, which is provided to generate the chamfer 5, and the circular skiving tool 19 for the chamfering, which is provided to generate the chamfer 9, are simply designed in the form of straight-toothed, cylindrical spur gears, wherein the teeth thereof are not illustrated in FIG. 2 on the end face of the circular skiving tools. After each regrinding, the cutting surfaces are in turn used as a contact surface on the tool spindle, such that the axial position of the cutting edge relative to the tool spindle does not change. In addition, due to the cylindrical shape of the straight circular skiving tool teeth, the radial position of the teeth relative to the tool spindle also does not change. The setup of the chamfering station, and its operation, are accordingly simple.

It is understood that the design of the tool arrangement with the circular skiving tools 15 and 19 for chamfering, as described above, is only an example, and that of course there is also the possibility of using ground circular skiving tools, or circular skiving tools with cutting face angle, as well as helical circular skiving tools and/or circular skiving tools with step cut, and combinations thereof.

The machine axes of a chamfering station comprising this tool arrangement 10 are therefore the rotation axis Z10, which can be operated by the CNC-controlled drive in synchronism with the rotation of the toothing axis Z2 of the workpiece, and the pivot axis A10. Furthermore, the tool arrangement 10 can be positioned relative to the workpiece via three linear axes (X, Y, Z,) by a pivot unit which is responsible for the axis A10, for example via cross-carriage assemblies. Thus, a linear movement axis Z can be configured for a movement parallel to the toothing axis Z2, a linear axis X can allow a radial approach/dip movement, and a linear axis Y can provide a tangential, additional linearly independent movement axis. The chamfering station thus acquires similar machine axes to those which primary tool assemblies (for instance with hobs) typically have.

FIG. 3 illustrates the relative position of the axes of rotation Z2 of the toothing 2 and Z10 of one of the circular skiving tool 15 or 19 for chamfering, in a simplest variant, in a perspective view (FIG. 3a), a top view (FIG. 3b) and a rear view (FIG. 3c), in viewing direction X. A plane E1 is thereby defined, in which lie the rotation axis Z2 of the toothing 2, as well as the tool center point of the circular skiving tools 15 (19) for chamfering. The axis intersection angle $\Sigma$ arises from a plane E2 which is orthogonal to the plane E1 and passes through the tool center point; it is the angle between the axis of intersection of the planes E1 and E2 and the tool axis of rotation Z10. In this embodiment, the chamfering circular skiving tool has straight teeth and the axis intersection angle $\Sigma$ is set to the angle of inclination $\beta$ of the respective equivalent toothing—that is, in the machining operation of the circular skiving tool 15 for chamfering, to form the chamfer 9 the axis intersection angle is set to the helix angle of the equivalent toothing C ($\Sigma=\beta_C$); the machining proceeds analogously in the machining operation of the chamfering circular skiving tool 19 to form the chamfer 5, at an axis intersection angle which is set to the helix angle of the equivalent toothing B ($\Sigma=\beta_B$). With balancing corrections, $\Sigma \neq \beta_C$ could also be used.

If, by way of example, the circular skiving tool 15 in the illustration of FIG. 3 works by single-flank machining to form the chamfer 9, then after the withdrawal of the chamfering circular skiving tool 15, the chamfering circular skiving tool 19 can be brought into machining engagement with the tooth flank 3 to form the chamfer 5, by the pivot axis A10 being used to set the right axis intersection angle $\beta_B$ and by positioning axes X, Y, Z being used to actuate the positioning movements for the machining operation. Because of the axial distance between the chamfering circular skiving tools 15 and 19, there is no risk of collision of the respective chamfering circular skiving tool which is not operating with the toothing 2.

A corresponding machining operation can follow on the other end face of the toothing 2 in an analogous manner, wherein the positioning axis Z enables the correct height, and due to the pivoting ability of the pivot axis A10, both chamfering circular skiving tools 15, 19 can switch their roles, since on the other end face the tooth flank 3 forms the acute angle and receives the chamfer 9, while the tooth flank 7 assumes an obtuse angle with the other end face and receives the chamfer 5.

For the machining operations, the correct skiving positions of the chamfering circular skiving tools relative to the toothing 2 of the workpiece must be maintained. In addition, depending on the accuracy requirements, the height of the end faces 6 of the toothing must be determined exactly for achieving the correct chamfer size.

As already explained further above, centering operations are carried out for this purpose with respect to the synchronous skiving motions. If, however, the rotational position of the chamfering circular skiving tools is known, and the workpiece toothing is not clamped in place between operations, the required phase position of the chamfering circular skiving tool for the workpiece toothing may already be available from the synchronous skiving motion, for example when the toothing 2 is generated by means of skiving, such that no additional centering operations are required due to a shared control. The determination of the height of the end faces of the toothings can be performed by sensors, as explained above—and also outside the machining station.

FIG. 3 illustrates the E1 plane—the X, Z plane—while the E2 plane is the Y, Z plane, and the connecting line between the centers of the toothing 2 and the chamfering circular skiving tool 15 (19) runs along the radial positioning axis X.

In the method variant shown in FIG. 4, the chamfering circular skiving tool, with its tool center, is offset out of the plane E1 (offset Y) relative to the variant in FIG. 3, and optionally also offset by other offset quantities X, Z. In this case, the connecting line CC between the workpiece center and the tool center, as well as the workpiece axis, defines a plane E3 which intersects plane E1 at an angle $\varphi$. The tool axis Z10 running in E2 then no longer lies in a normal plane E4 to CC passing through the tool center. Rather, it is inclined with respect to the same (additional tilt angle). By way of example, the helix angle $\beta_C$ (for chamfering circular skiving tool 15) and/or $\beta_B$ (for chamfering circular skiving tool 19) will be used for further operations (with straight-toothed chamfering circular skiving tools). The pivot angle to be set on the pivot axis A10 then no longer corresponds to the helix angle $\beta_C$ (and/or $\beta_B$). Rather, it is modified as in a projection (for a base setting: tan $\Sigma'$=cos $\varphi$ tan $\Sigma$). The machine axis configuration with a non-zero tilt angle increases the variability of the method, and, because of the change in the cutting direction, allows additional opportunities to influence the formation of the chamfer without needing to require an additional pivot axis (the offset is sufficient).

The invention is not limited to the specific features indicated in the preceding description of the figures. Rather, the features of the appended claims and the above description can be essential individually and in combination to the implementation of the invention in its various embodiments.

The invention claimed is:

1. A method for machining a toothing (2), wherein to form a chamfer (5) on a tooth edge formed between an end face (6) of the toothing and a tooth flank belonging to a tooth space (4) of the toothing, material is removed from the tooth edge by cutting, by means of a machining tool (15) equipped with a cutting edge, in a machining operation,
characterized in that the machining tool is toothed and the machining operation is a skiving machining operation at an axis intersection angle ($\Sigma$) between the rotational axes (Z10, Z2) of the machining tool and the toothing, which does not extend beyond the tooth root section of the tooth space,
wherein first toothing data of a first equivalent toothing (B), whose helix angle is determined by the orientation of the chamfer (5), wherein the transverse section profile thereof matches that of the toothing being machined in the transition (8) from the tooth flank into the tooth edge chamfer being formed, is determined from predetermined chamfer parameters for the chamfer which relate to its size and its orientation to the end face, as well as from toothing parameters of the toothing being machined, relating to its profile, or, profile and helix angle.

2. The method according to claim 1, wherein a chamfer (9) on the other tooth edge of the same tooth space (4) is also generated on the same end face (6), but in a subsequent, separate other machining operation.

3. The method according to claim 2, wherein the other machining operation is carried out with a different other machining tool (19).

4. The method according to claim 2 wherein the other machining operation is executed at a different axis intersection angle.

5. The method according to claim 2 wherein second toothing data of a second equivalent toothing (C), whose helix angle is determined by the orientation of the chamfer (9), wherein the transverse section profile thereof matches that of the toothing being machined in the transition from the tooth flank into the other tooth edge chamfer being formed, is determined from predetermined chamfer parameters for the chamfer which relate to its size and its orientation to the end face, as well as from toothing parameters of the toothing being machined, relating to its profile, or, profile and helix angle.

6. The method according to claim 1 wherein the machining tool is configured according to the first toothing data, and the machining tool is a circular skiving tool (15) designed to generate the first equivalent toothing by skiving.

7. The method according to claim 5 wherein the other machining tool is configured according to the second toothing data, and the other machining tool is a circular skiving tool (19) designed to generate the second equivalent toothing by skiving.

8. The method according to claim 3 wherein the machining tool and the other machining tool have a shared axis of rotation (Z10) which can pivot by more than 180°.

9. The method according to claim 3 wherein at least one of the machining tool and the other machining tool is designed as a straight-toothed circular skiving tool.

10. The method according to claim 6 wherein the axis intersection angle of at least one of the machining tool and the other machining tool is set to the helix angle ($\beta_B$, $\beta_C$) of the first or second equivalent toothing.

11. The method according to claim 1 wherein a non-zero tilt angle is set between the axis of rotation of the machining tool and a plane which is orthogonal to the connecting direction between the centers of the toothing and the machining tool, by means of an offset in the plane which is orthogonal to the toothing axis.

12. A tool arrangement (10) for forming a chamfer (5; 9) on the tooth edges formed between an end face of a toothing and its tooth flanks, having a first wheel-like machining tool (15) which is toothed on the front, the axis of rotation (Z10) of which can be pivoted by more than 180° to form the chamfer (5) on one side of the tooth space (4) of the toothing, and having a second wheel-like machining tool (19) which is toothed on the front, with the same axis of rotation (Z10) to form the chamfer (9) on the other side of the tooth space.

13. The tool arrangement according to claim 12, wherein the first and/or second machining tool (15; 19) has straight teeth.

14. The tool arrangement according to claim 12 wherein the first and second machining tools are each made in the form of a cylindrical skiving tool (15; 19), the crown circle diameters of the tools do not differ by more than 15%, and the machining tools are formed without at least one of a cutting face angle and relief grinding.

15. The tool arrangement according to claim 12 having a shared drive for both machining tools, engaging between the machining tools.

16. The tool arrangement according to claim 12 wherein a cutting surface of the machining tools is a direct contact surface on the tool spindle.

17. The tool arrangement according to claim 12 wherein the front sides with the cutting edges of the machining tools face toward each another or face away from each other.

18. A chamfering station having a tool arrangement (10) according to claim 12 with at least one linearly independent linear machine axes (X, Y, Z) for positioning the tool arrangement with respect to a workpiece position.

19. A toothing machine, having a workpiece spindle to receive a workpiece in a manner allowing rotary drive, having a primary tool for generating a toothing (2) on the workpiece, and having a machine axis (A10) for setting an axis intersection angle between a toothed machining tool (15; 19) for forming a chamfer (5; 9) on a tooth edge formed between an end face (62) of the toothing and a tooth flank belonging to a tooth space (4) of the toothing,
characterized by a control device which is programmed to allow running a method on the toothing machine according to claim 1.

* * * * *